Patented Sept. 10, 1940

2,214,402

UNITED STATES PATENT OFFICE 2,214,402

POLYMERIC MATERIALS

Wallace Hume Carothers, deceased, late of Wilmington, Del., by the Wilmington Trust Co., executor, Wilmington, Del., assignor to E. I. du Pont de Nemours & Company, Wilmington, Del., a corporation of Delaware No Drawing. Application July 25, 1938,
Serial No. 221,262

13 Claims. (Cl. 260—33)

This invention relates to synthetic linear condensation polymers and more particularly to plasticized compositions comprising these polymers.

This application is a continuation-in-part of application Serial Number 74,811 filed April 16, 1936, now U. S. P. 2,190,770, which is a continuation-in-part of abandoned application Serial Number 34,477 filed August 2, 1935, which is a continuation-in-part of application Serial Number 181 filed January 2, 1935, now U. S. P. 2,130,523, which in turn is a continuation-in-part of Patent 2,071,250.

The present invention is concerned with improvements in the new class of fiber-forming materials which are known as synthetic linear condensation polymers and which are described in the above mentioned patent and applications. A characteristic property of these polymers is that they can be formed into filaments which can be cold drawn into fibers showing molecular orientation along the fiber axis. Of these polymers, the polyamides are particularly useful for the preparation of fibers, bristles, ribbons, sheets, rods, tubes, and the like. The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming derivatives. On hydrolysis with strong mineral acids, the polyamides revert to the bifunctional reactants from which they are derived. For example, a polyamide derived from a diamine and a dibasic acid yields on hydrolysis with hydrochloric acid the dibasic acid and the diamine hydrochloride.

Although the synthetic linear condensation polyamides as a class are microcrystalline and have fairly high and sharp melting points, they can be formed into many useful objects without the use of solvents or plasticizers. This is accomplished by spinning, extruding, or otherwise forming the object from the molten polyamide. To improve the properties of the products thus formed, it is generally desirable to subject them to a process of cold drawing (application of tensile stress) or to a process of cold rolling (application of compressive stress) or by subjecting them to both cold drawing and cold rolling. These processes of cold drawing and cold rolling to bring about orientation of the polyamide molecule will be referred to generally as cold working. The products thus formed are unusually strong, have high melting points, and for many purposes are sufficiently pliable. For certain uses, however, and particularly for use in the form of films, sheets and the like, greater pliability is sometimes desired.

Because of the marked difference in structure and properties, e. g., solubility and compatibility characteristics, between the polymers with which the present invention is concerned and fiber-forming materials derived from cellulosic derivatives, the plasticizer requirements of these two classes of materials differ very markedly. For these reasons it is impossible to predict whether a given plasticizer for a cellulose derivative will function as a polyamide plasticizer. The fact that polyamides are insoluble in the solvents used for cellulosic materials and are in general soluble only in phenols and formic acid is also a limiting factor in the selection of a plasticizer to be incorporated by the customary solvent procedure. Another factor which must be taken into consideration is that polyamides, unlike cellulosic derivatives, are susceptible to cold drawing and that polyamide filaments, ribbons, and the like are normally cold drawn before they are used. For the preparation of such products the plasticizer must be one which does not interfere with cold drawing.

This invention has as an object the preparation of new compositions useful in making articles such as filaments, bristles, ribbons, films, sheets, rods, tubes, etc. A further object is to improve the properties, particularly the pliability, of synthetic linear condensation polyamides and of articles derived therefrom.

The above objects are accomplished by incorporating with the polyamides certain solvents, softeners, and plasticizing agents, more particularly referred to below, which markedly enhance the utility of the polyamides in the manufacture of articles of the above mentioned kind and which are particularly useful as plasticizing agents for the polyamides.

Of the compositions described in the mentioned earlier cases, the most valuable in accomplishing the objects of this invention are those which comprise solutions of the polyamide in a phenol, or those in which the phenol serves to soften the polyamide as is mentioned in said application Serial Number 181, now U. S. P. 2,130,423. Monomeric amides, exemplified by formamide in the above mentioned cases, also yield valuable polyamide compositions.

An advantageous method for producing plasticized products is to immerse the polyamide in the form of sheets, films, etc., in a solution of the plasticizing agent in a non-solvent for the polyamide. Alcohol solutions are particularly useful for this purpose. Under these conditions the plasticizing agent is readily absorbed by the polyamide. In many instances selective absorption occurs as evidenced by the fact that the concentration of the agent within the polyamide can be made to exceed that within the solution. After the desired amount of the plasticizing agent has been absorbed by the polyamide, the polyamide is removed and dried. In the solid plasticized products the quantity of agent may range from 1% to 40% in the case of the phenol and from 1% to 40% in the case of the monomeric amides. The plasticizing effect is enhanced by the presence within the polyamide of a small amount of alcohol or water. The amount of water which the polyamide absorbs from the air under ordinary conditions of humidity, although only a few per cent, is usually sufficient for this purpose. The amount of the agent used depends upon the nature of the phenol and the properties desired in the final product.

Other methods of incorporating the phenol can also be used. For example, the polyamide and phenol can be dissolved in a mutual solvent and the solution used in making filaments, films, etc., either by the evaporative or coagulative methods. Formic acid can be used as a solvent for this purpose. In certain instances, e. g. in the case of many interpolyamides, alcohols and mixtures of alcohols with halogenated hydrocarbons can be used as solvents. Another method of incorporating the phenol consists in adding it to the molten polyamide.

Owing to the fact that most phenols are thermally stable at high temperatures and are substantially chemically inert toward the polyamides, they can be incorporated with polyamides by another method which is very useful. This method, illustrated in subsequent Example II, consists in incorporating the phenol with the monomeric reactants used to prepare the polyamide and to conduct the condensation polymerization in the presence of the phenol. This gives a homogeneous mixture of polyamide and phenol which can be directly extruded, cast, or otherwise formed into useful articles.

Methods for practicing the present invention are illustrated by the following examples:

Example I

A ribbon of polyhexamethylene adipamide, a synthetic linear condensation polymer (intrinsic viscosity, 0.85) derived from hexamethylenediamine and adipic acid, was prepared by extruding the molten polymer between rollers immersed in cold water. A sample of this ribbon (thickness Ca. 0.030 inch) was immersed in a saturated solution of a 4-tertiary butyl phenol in 50% aqueous ethyl alcohol maintained at 70-75° C. After 2.5 hours, the ribbon was removed, rinsed twice with 50% aqueous alcohol and dried to constant weight over calcium chloride. The ribbon, which showed an increase in weight of 15%, was more pliable than the original ribbon. When allowed to remain for several hours in air under normal conditions of temperature and humidity, it absorbed about 2% of its weight of moisture. The ribbon containing both the 4-tertiary butyl phenol and water was much more pliable than either the unplasticized ribbon or the ribbon containing only the 4-tertiary butyl phenol. When cold rolled by passing several times through an even speed mill, the ribbon was transformed into a transparent sheet which was softer than a similarly rolled sheet of unplasticized polyhexamethylene adipamide.

Example II

Twelve (12) parts of hexamethylene diammonium adipate, the salt derived from hexamethylene diamine and adipic acid, and 7 parts of diphenylolpropane.

were charged into a closed vessel. The air and moisture were thoroughly removed by evacuating the vessel under 2 mm. mercury pressure for fifteen minutes. The charge was heated by means of a metal bath for two hours at 210°–230° C., and then for three hours at 245°–265° C. under 5 mm. mercury pressure. The resulting polyhexamethylene adipamide containing 40 per cent of diphenylolpropane was a light yellow, tough, homogeneous solid melting at 210° C. A sample of this composition molded at 210° C. gave a transparent tough sheet of extreme pliability. This molded product could be cold drawn or cold rolled with much greater ease than unplasticized polyhexamethylene adipamide. In addition to inducing pliability and lower softening temperature to the polyamide, the diphenylolpropane retarded crystallization of the polyhexamethylene adipamide to such an extent that the material could be molded to a transparent sheet without quenching. Sheets molded from unplasticized polyhexamethylene adipamide, unless they are rapidly chilled by quenching in a liquid nonsolvent, are generally opaque or translucent.

Example III

Ten (10) parts of polyhexamethylene adipamide having an intrinsic viscosity of about 0.9 was fused at 280° C. in an atmosphere of carbon dioxide to form a viscous melt. To this melt was added with stirring a mixture of three (3) parts of diphenylolpropane and two (2) parts of carvacrol. The materials blended to yield a fairly fluid homogeneous melt, which upon cooling set to a tough amber solid melting at 218° C. This composition could be cast or extruded into pliable transparent sheets having considerable elasticity. The composition could be molded at about 220° C.

Example IV

Twenty (20) parts of a copolyamide or interpolyamide of intrinsic viscosity 0.85 (prepared from equimolecular parts of hexamethylene diammonium adipate and decamethylene diammonium sebacate), 5 parts of dicresyl carbitol, 3 parts of diphenylolpropane, and 3.5 parts of 4-tertiary butyl catechol were dissolved in 35 parts of normal butyl alcohol, by heating the mixture under reflux for 4 hours at 140° C. A portion of this solution was poured while still hot onto a glass plate at about 70° C. and an even film produced by means of a doctor knife. After baking for 3 hours at 100° C. the film was removed from the glass plate by immersion in water. The resulting film (0.007 inch thick) was transparent and pliable and had considerable elasticity. It softened at 118° C. on a copper block in the open air. The tensile strength was 3150 lbs./sq. in., based on the original dimensions, and the elongation about 400%.

*Example V*

Seven hundred and eighty-six (786) parts of hexamethylene diammonium adipate, 165 parts of a mixture of N-ethyl-o- and p-toluene sulfonamides, and 127 parts of p-tertiary amyl phenol were charged into an autoclave, and the air removed by evacuating the vessel under 2 mm. mercury pressure. The pressure was then restored to atmospheric by introducing oxygen-free nitrogen. The charge was heated at 265°-270° C. for three hours under conditions which permitted the removal of water formed during the reaction. The last traces of moisture were removed by evacuating to 2 mm. mercury pressure for fifteen minutes. The molten mass was then removed from the autoclave by extruding through a narrow slit into cold water. The ribbon thus formed was clear and very pliable. It melted at 235° C. when tested in the open on a copper block. The ribbon was much more pliable and clear than a ribbon similarly prepared from unplasticized polyhexamethylene adipamide. On cold rolling by passing several times between the rolls of an even speed mill, the ribbon became even more pliable and clear. A sample of this ribbon was molded in a poker chip die at 230° C. under 5000 pounds pressure to yield a hard, tough, semitransparent chip.

*Example VI*

Polyhexamethylene adipamide was prepared in the presence of 15% diphenylolpropane and the mixture extruded in ribbon form as described in Example V. The resultant ribbon was clear, pliable, and melted at about 245° C. Its tensile strength was 9,000 lbs./sq. in. based on the original dimensions of the ribbon and 45,000 lbs./sq.in. based on the dimensions of the ribbon at the breaking point. These strengths are fully as high as those of unplasticized polyhexamethylene adipamide.

It is to be understood that the aforementioned examples are merely illustrative of the compositions of this invention and their manner of preparation. As examples of additional synthetic linear condensation polyamides which can be plasticized by the practice of this invention, there may be mentioned polytetramethylene sebacamide, polypentamethylene adipamide, polypentamethylene sebacamide, polyhexamethylene glutaramide, polyhexamethylene sebacamide, polyoctamethylene adipamide, polydecamethylene carbamide, poly-p-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are examples of linear condensation polymers derived from amino acids which may also be used. As illustrated in Example IV, copolyamides or interpolyamides can likewise be plasticized. Obviously, the invention is applicable to mixtures of polyamides. In general, the synthetic linear condensation polyamides do not exhibit fiber-forming properties unless they have an intrinsic viscosity above 0.4. Likewise to be useful in making films, ribbons, rods, etc., the polyamides should have an intrinsic viscosity above 0.4, and preferably above 0.6. The expression, intrinsic viscosity, is to be understood in accordance with the definition thereof contained in U. S. Patent 2,130,948, which was issued to the applicant on September 20, 1938, on an application which was copending herewith. This invention is concerned primarily with plasticized polyamides which exhibit fiber-forming properties.

Instead of the polyamides mentioned above which are obtainable from bifunctional polyamide-forming reactants as essentially sole reactants, I may use the linear condensation polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4.

The phenols used as plasticizing agents are preferably high boiling phenols (above 220° C.) such as polynuclear, or polyhydric, or C-alkyl substituted phenols. The phenols are preferably free from amide-forming groups. Additional examples of suitable phenols are resorcinol, hexyl phenol, triisopropyl phenol, octyl catechol, o- and p-phenyl phenols, sec-hexyl-2-chloro-4-hydroxy toluene, diamyl phenol, cyclohexyl phenol, hexyl resorcinol, octyl beta-naphthol, beta-naphthol, hydroquinone, salicylic acid, salicylic acid esters, and o-hydroxydiphenyl, the cresols, xylenol, and thymol.

Owing to the solvent action of phenols on polyamides, the phenols are very useful blending agents for plasticized polyamide compositions. Through the use of phenols, e. g. diamyl phenol, it is possible to incorporate successfully with polyamides certain otherwise inactive plasticizers, such as tricresyl phosphate.

When the monomeric amides are used in place of the phenols, the higher boiling amides (those having a boiling point of at least 220° C.), and particularly the sulfonamides, are preferred. Of these materials, the aryl sulfonamides and especially the N-alkyl aryl sulfonamides, as for instance the N-ethyl (ortho or para) toluene sulfonamides, are particularly desirable. Additional examples of suitable monomeric amides are: N-butyl-p-toluene sulfonamide, N-diamyl-p-toluene sulfonamide, N-phenyl-cyclohexane sulfonamide, naphthalene sulfonamide, benzamide, salicylamide, tetrabutyl adipamide, lauramide, and bis-ethanol diglycolamide.

The invention is not limited to compositions consisting of the polyamide and plasticizer or solvent alone. As already indicated, the plasticizing effect is increased by the presence of a small amount of water. Other hydroxylated non-solvents, particularly alcohols such as methanol, propanol, isobutanol, benzyl alcohol, cyclohexanol, hexamethylene glycol, and glycerol have a similar effect. Moreover, there may be associated with the polyamide-phenol compositions other types of plasticizer, e. g. dibutyl phthalate and triphenyl phosphate, cyclic ketones, and carboxylic acids. Particularly valuable products are obtained by using the phenols in conjunction with amides, especially N-alkyl aryl sulfonamides. Such a composition is illustrated in Example V. The compositions of this invention may also contain other types of modifying agents, e. g. luster modifying materials, pigments, dyes, antioxidants, oils, antiseptics, cellulose derivatives, etc.

The solid plasticized products of this invention are highly advantageous in that the plasticizing agent not only does not interfere with cold drawing or cold working, or with the orientation of the polymer molecules, but also actually improves the working properties, particularly cold rolling. Furthermore, the pliability of the product is more marked in the cold rolled than in the unrolled product. The agents used improve the clarity of the product and apparently function by retarding crystallization. The lowering of the melting point is desirable, in certain instances at least, because it makes possible extrusion of the molten material at lower temperatures, thus avoiding thermal decomposition. Addition of the plasticizing agent does not materially lower the strength of the product. In the case of phenol, even when present in an amount as low as 0.5%, the products retain their strength better on exposure to sunlight than do the pure polyamides.

The polyamide-phenol compositions are useful in many forms and for many purposes. Typical applications are yarns, fabrics, bristles, surgical sutures, fishing leaders, fishline, dental floss, rods, tubes, films, ribbons, sheets, safety glass interlayers, molded articles, turnery compositions, adhesives, electrical insulation (e. g., for wires), impregnating agents, and coating compositions. An advantage which these compositions have over unmodified polyamides is that they are more pliable. This is most important in connection with the use of the product in the sheet form. It is also important in molding, particularly injection molding. A further advantage of these compositions over unmodified polyamides is that they are more readily cold rolled. Another advantage is that they exhibit superior durability on outdoor exposure.

The compositions claimed herein when in the form of solutions of the polyamide in the phenol or monomeric amide are valuable as spinning solutions for spinning into filaments and the like by wet or dry spinning methods. The solutions can also be applied as coating compositions to wood, metal, paper, leather, cloth, etc.

As many apparently widely different embodiments of this invention may be made without departing from the spirit and scope thereof, it is to be understood that the invention is not limited to the embodiments thereof except as defined in the appended claims.

What is claimed is:

1. A composition of matter comprising a synthetic linear polyamide and a phenol, the said polyamide being one which is capable of being drawn into fibers showing by X-ray examination orientation along the fiber axis.

2. A synthetic linear polyamide plasticized with a mixture comprising a phenol and a hydroxylated non-solvent for the polyamide, the said polyamide being one which is capable of being drawn into fibers showing by X-ray examination orientation along the fiber axis.

3. The plasticized polyamide set forth in claim 2 in which said hydroxylated non-solvent is water.

4. A synthetic linear polyamide plasticized with a phenol and a monomeric amide, the said polyamide being one which is capable of being drawn into fibers showing by X-ray examination orientation along the fiber axis.

5. A composition of matter comprising a synthetic linear polyamide and as a plasticizer therefor a phenol having a boiling point above 220° C., said polyamide being one which is capable of being drawn into fibers showing by X-ray examination orientation along the fiber axis.

6. The composition set forth in claim 5 in which said phenol is an alkyl phenol.

7. A composition of matter comprising a synthetic linear polyamide dissolved in a phenol, the said polyamide being one which is capable of being drawn into fibers showing by X-ray examination orientation along the fiber axis.

8. A composition of matter comprising a synthetic linear polyamide and a phenol, the said polyamide being one which has an intrinsic viscosity of above 0.4.

9. A composition of matter comprising a synthetic linear polyamide and as a plasticizer therefor a phenol having a boiling point above 220° C., the said polyamide being one which has an intrinsic viscosity of above 0.4.

10. A composition of matter comprising a synthetic linear polyamide dissolved in a phenol, the said polyamide being one which has an intrinsic viscosity of above 0.4.

11. The composition of matter set forth in claim 9, in which the said polyamide is an interpolyamide.

12. The composition of matter set forth in claim 9 in which the said polyamide is polyhexamethylene adipamide.

13. The composition of matter set forth in claim 9 in which the said phenol is a polynuclear phenol.

WILMINGTON TRUST COMPANY,
*Executor of the Estate of Wallace Hume Carothers, deceased.*

By ELWYN EVANS,
*Vice-President.*

CERTIFICATE OF CORRECTION.

Patent No. 2,214,402.                 September 10, 1940.

WALLACE HUME CAROTHERS, deceased,
by the WILMINGTON TRUST CO., EXECUTOR.

It is hereby certified that error appears in the printed specification of the above numbered patent requiring correction as follows: Page 1, second column, line 51, for "2,130,423" read --2,130,523--; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.